United States Patent
Stess

(10) Patent No.: US 11,092,444 B2
(45) Date of Patent: Aug. 17, 2021

(54) METHOD AND SYSTEM FOR RECORDING LANDMARKS IN A TRAFFIC ENVIRONMENT OF A MOBILE UNIT

(71) Applicant: Volkswagen Aktiengesellschaft, Wolfsburg (DE)

(72) Inventor: Marek Stess, Ronnenberg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 185 days.

(21) Appl. No.: 16/319,896

(22) PCT Filed: Jun. 13, 2017

(86) PCT No.: PCT/EP2017/064405
§ 371 (c)(1),
(2) Date: Jan. 23, 2019

(87) PCT Pub. No.: WO2018/019466
PCT Pub. Date: Feb. 1, 2018

(65) Prior Publication Data
US 2019/0271551 A1 Sep. 5, 2019

(30) Foreign Application Priority Data

Jul. 29, 2016 (DE) .................. 10 2016 214 027.2

(51) Int. Cl.
*G01C 21/32* (2006.01)
*G01S 7/48* (2006.01)
(Continued)

(52) U.S. Cl.
CPC ............ *G01C 21/32* (2013.01); *G01S 7/4802* (2013.01); *G01S 7/4808* (2013.01); *G01S 17/06* (2013.01); *G01S 17/42* (2013.01); *G01S 17/931* (2020.01)

(58) Field of Classification Search
CPC ......... G01C 21/32; G01S 17/06; G01S 17/42; G01S 7/4802; G01S 7/4808; G01S 17/931
See application file for complete search history.

(56) References Cited

U.S. PATENT DOCUMENTS 6,529,614 B1 * 3/2003 Chao .................... G06K 9/3241
382/103
7,933,433 B2 4/2011 Ogawa .......................... 382/104
(Continued)

FOREIGN PATENT DOCUMENTS

DE 102016214027 A1 2/1918 ............. G01B 11/24
DE 10148068 A1 4/2003 ............. G01S 17/93
(Continued)

OTHER PUBLICATIONS

Fuerstenberg, Kay et al., "Object Tracking and Classification using Laserscanners—Pedestrian Recognition in Urban Environment," IEEE Intelligent Transportation Systems Conference Proceedings—Oakland, CA, USA, pp. 451-453, Aug. 25, 2001.
(Continued)

*Primary Examiner* — Behrang Badii
*Assistant Examiner* — Daniel L Greene
(74) *Attorney, Agent, or Firm* — Slayden Grubert Beard PLLC

(57) ABSTRACT

The invention relates to a method for recording landmarks in a traffic environment of a mobile unit, in which data sets are recorded by a laser scanner, wherein the data sets comprise data points. Data points from a certain number of data sets are saved as output data and, based on the output data, segments are determined by means of segmentation, wherein data points are assigned to each of the segments. For each of the determined segments, landmark parameters of the respective segment are determined by means of a principle component analysis and an object class is assigned (Continued)

to the segments based on the landmark parameters respectively determined for them. Landmark observations are determined, wherein landmark parameters and an object class are assigned to each landmark observation, and the landmark observations are output. The invention relates further to a system for recording landmarks in a traffic environment of a mobile unit.

18 Claims, 4 Drawing Sheets

(51) Int. Cl.
*G01S 17/42* (2006.01)
*G01S 17/06* (2006.01)
*G01S 17/931* (2020.01)

(56) References Cited

U.S. PATENT DOCUMENTS

| | | |
|---|---|---|
| 10,072,936 B2 | 9/2018 | Nagy |
| 2009/0043504 A1* | 2/2009 | Bandyopadhyay ..... G01S 19/48 701/469 |
| 2012/0215377 A1 | 8/2012 | Takemura et al. ................ 701/1 |
| 2013/0223673 A1* | 8/2013 | Davis ..................... G06Q 30/00 382/100 |
| 2013/0253753 A1 | 9/2013 | Burnette et al. ................ 701/26 |
| 2014/0201126 A1* | 7/2014 | Zadeh ..................... A61B 5/165 706/52 |
| 2015/0170526 A1 | 6/2015 | Wang et al. ..................... 701/16 |
| 2015/0173699 A1* | 6/2015 | Kyriakou ............... A61B 6/501 378/62 |
| 2016/0357262 A1* | 12/2016 | Ansari ............... G06Q 10/0833 |
| 2017/0307386 A1* | 10/2017 | Stess .................... G06K 9/6215 |
| 2019/0108447 A1* | 4/2019 | Kounavis ........... G06K 9/00355 |

FOREIGN PATENT DOCUMENTS

| | | | |
|---|---|---|---|
| DE | 102004003850 A1 | 8/2005 | ................ E01F 9/08 |
| DE | 102006050214 A1 | 5/2007 | ........... B60W 30/12 |
| DE | 102007020791 A1 | 11/2007 | ............... G06K 9/62 |
| DE | 102012218362 A1 | 4/2014 | ........... G08G 1/0967 |
| WO | 2018/019466 A1 | 2/1918 | ............. G01S 17/06 |
| WO | 99/01843 A1 | 1/1999 | ............... C12Q 1/68 |

OTHER PUBLICATIONS

Zhou, Ying et al., "A Fast and Accurate Segmentation Method for Ordered LiDAR Point Cloud of Large-Scale Scenes," IEEE Geoscience and Remote Sensing Letters, vol. 11, No. 11, pp. 1981-1985, May 22, 2014.

International Search Report and Written Opinion, Application No. PCT/EP2017/064405, 19 pages, dated Aug. 24, 2017.

* cited by examiner

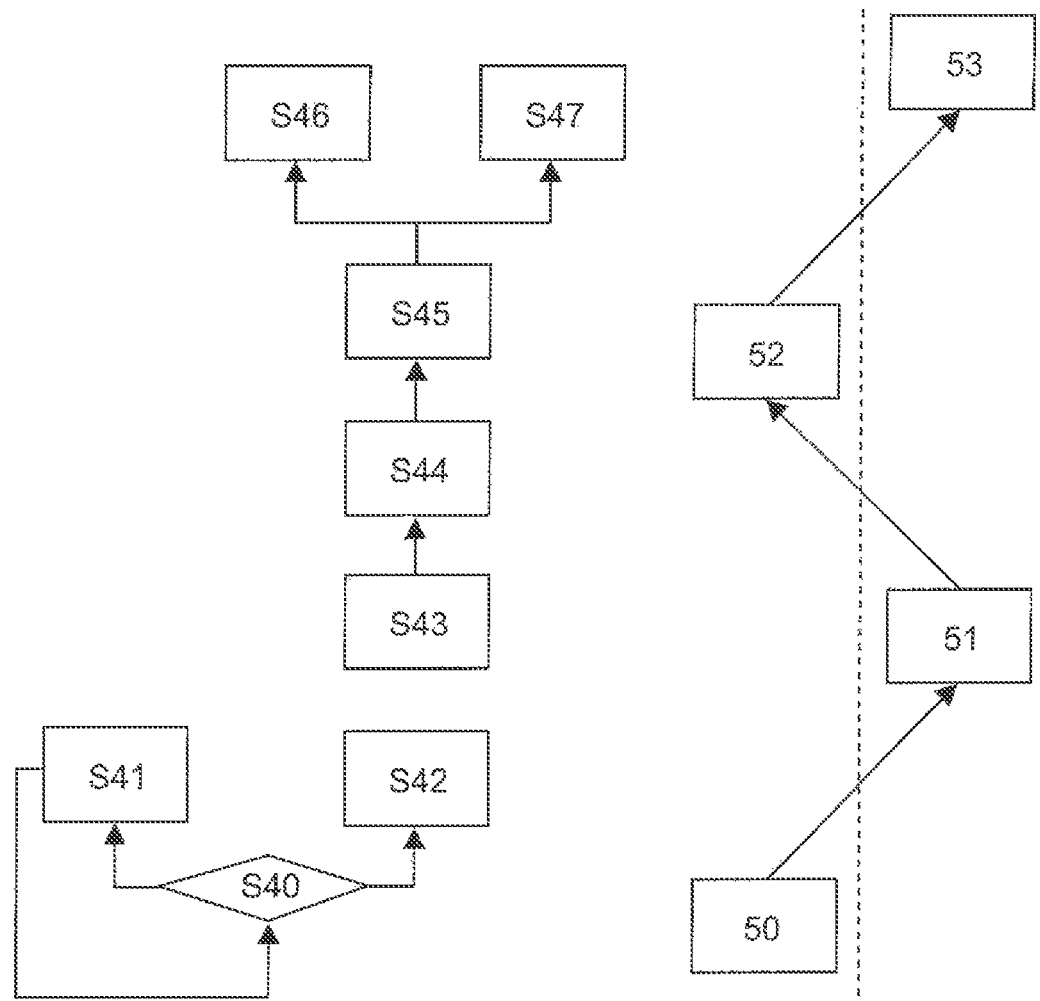

11,092,444 B2

METHOD AND SYSTEM FOR RECORDING LANDMARKS IN A TRAFFIC ENVIRONMENT OF A MOBILE UNIT

CROSS-REFERENCE TO RELATED APPLICATIONS

This application claims priority to German Patent Application No. DE 10 2016 214 027.2, filed on Jul. 29, 2016 with the German Patent and Trademark Office. The contents of the aforesaid German Patent Application is incorporated herein in their entireties for all purposes.

TECHNICAL FIELD

The present invention relates to a method and a system for recording landmarks in a traffic environment of a mobile unit, in particular a vehicle.

The exact localization of the vehicle is an important prerequisite for the increasing integration of automatic driving functions in modern vehicles. It is thereby not enough to know the approximate position of the vehicle within a few meters; rather, even smaller deviations, for instance along the width of a traffic lane, can have considerable effects on the drive.

In order to enable a sufficiently exact and reliable localization of the vehicle, approaches for landmark-based locating are followed, for instance.

In the case of the method described in DE 10 2004 003 850 A1 for detecting markings on a road, distance images of a recording area are recorded by a laser scanner in a temporal sequence and the distance to a detected marking is estimated. Markings are identified by detecting straight lines on the road.

DE 10 2007 020 791 A1 suggests a lane marking detection device, in which a center line and a road width are extracted from data from a Lidar instrument. Parameter tracking is thereby applied.

Nevertheless, there is still a need for methods for recording landmarks which can be operated quickly, robustly and in a resource-friendly manner. An object thus exists to provide such a method and system.

SUMMARY

The object is solved according to the present invention by the subject matter of the independent claims. Embodiments are discussed in the dependent claims and the following description.

In one aspect of a method for recording landmarks in a traffic environment of a mobile unit, data sets are recorded by a laser scanner, wherein the data sets comprise data points. Data points from a certain number of data sets are saved as output data and, based on the output data, segments are determined by means of segmentation, wherein data points are assigned to each of the segments. For each of the determined segments, landmark parameters of the respective segment are determined by means of a principle component analysis. An object class is assigned to the segments based on the landmark parameters determined for each of them. Landmark observations are determined, wherein landmark parameters and an object class are assigned to each landmark observation, and the landmark observations are output.

BRIEF DESCRIPTION OF THE DRAWINGS

The invention is now explained below based on exemplary embodiments with reference to the drawings.

FIG. 5 shows a performing of a particle-filter-based localization and FIG. 6 shows an exemplary embodiment of an update functionality.

DETAILED DESCRIPTION

Figure 1A:
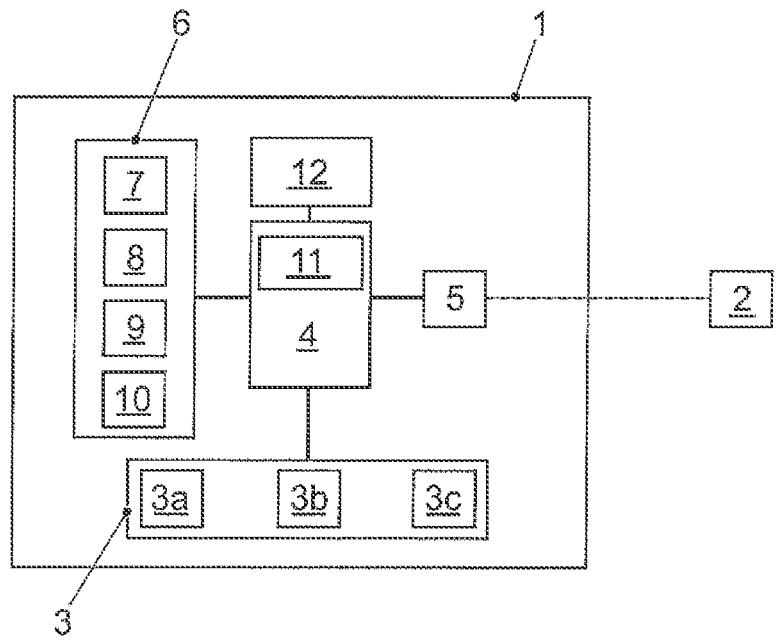
FIGS. 1A and 1B show an exemplary embodiment of the system according to the present aspect.

As discussed in the preceding and in one aspect of a method for recording landmarks in a traffic environment of a mobile unit, data sets are recorded by a laser scanner, wherein the data sets comprise data points. Data points from a certain number of data sets are saved as output data and, based on the output data, segments are determined by means of segmentation, wherein data points are assigned to each of the segments. For each of the determined segments, landmark parameters of the respective segment are determined by means of a principle component analysis. An object class is assigned to the segments based on the landmark parameters determined for each of them. Landmark observations are determined, wherein landmark parameters and an object class are assigned to each landmark observation, and the landmark observations are output.

A particularly simple and quick recording of landmarks can thereby be performed. In particular, this recording may in some embodiments take place within the framework of a localization of a mobile unit, for instance a vehicle.

The method according to the present aspect works in particular in a vector-based manner; i.e., a comprehensive, space-resolved mapping of a space is not performed, as is provided in the case of point- or raster-based methods, but rather individual objects are detected, parameterized and saved based on this parameterization. The method can thereby be operated quickly and with comparatively little need for memory and computing power, which is particularly beneficial for mobile units, in vehicles for instance.

The term "position" comprises in a narrower sense the coordinates of a point in a coordinate system, wherein a coordinate system relative to the mobile unit or a global coordinate system can be observed. In a broader sense, however, the term "position" should also comprise characteristics which typically fall under the term "pose," in particular an alignment of the mobile unit in one particular direction in the coordinate system. In order to simplify the representation, the term "position" is used below, wherein the further characteristics of a "pose" should not be excluded.

In terms of the present explanation, "landmarks" are understood among other things as orientation points and topographical objects, which are recognizable and classifiable as well as suitable for structuring a spatial area or respectively relative to which a position can be defined in terms of the present explanation. In particular, objects that can be depicted as geometrical shapes and parameterized, for instance based on their shape, position, area, length and width, are classifiable. Elements of the traffic infrastructure, for example road markings, traffic signs, lighting systems, bridges and other traffic structures, count in particular as landmarks. Furthermore, other structures such as houses, plants such as trees, and landscape features such as elevation changes also count as landmark elements. Landmarks should also be recognizable, that is to say their appearance and their other properties should remain mainly constant for a certain period of time, in particular such that a recognizability based on the landmarks is possible over a sufficiently long time period in order to be able to take into consideration changes by means of an updating functionality if applicable.

In particular, according to some embodiments, semantically interpretable elements of the street infrastructure are recorded as landmarks. Furthermore, these can be grouped by their geometry as well as according to the options for processing and recording. In some embodiments, it is possible to differentiate between point-based landmarks, such as poles, posts and columns, which can be detected in particular by means of Lidar, line-based landmarks, such as dashed lines, arrows and stop lines, which can be detected in particular by means of Lidar or a camera, as well as polyline-based landmarks, such as solid lines, which can be represented as line segments and for the detection of which a camera can be used in particular.

For characterizing a landmark observation, a state vector is generated, wherein the data stored in this state vector differs depending on the type of landmark: The state vector $s^{PO}$ of a point-based landmark observation comprises a position $p^{vrf}$ in the vehicle coordinate system, an uncertainty $\Sigma_p$ and an absolute position $p^{wgs}$ in a global coordinate system. The points are thereby specified as a triple $p=(x,y,z)$. Furthermore, a diameter and a height are defined, and a time stamp for the observation as well as an identification of the observing sensor are saved. Furthermore, fields for a probability value and an identification of a determined landmark are provided, which are used for further processing later in the method. For the state vector $s^{DL}$ of a line-based landmark observation or respectively the state vector $s^{PL}$ of a polyline-based landmark observation, two or more positions $(p_1^{vrf}, \ldots, p_n^{vrf})$ are provided as well as correspondingly many uncertainties $(\Sigma_{p_1}, \ldots, \Sigma_{p_n})$ and absolute positions $(p_1^{wgs}, \ldots, p_n^{wgs})$ as well as modified parameters like the width and length of the (poly) line.

Alternatively or additionally and in some embodiments, further parameterizations of a landmark observation, in particular for other types of landmarks, are provided.

The "traffic environment" of the mobile unit in terms of the present explanation comprises a spatial environment of a position of the mobile unit, in some embodiments with respect to the properties relevant for traffic in this environment. For example, the environment of a traffic participant, for instance on a road, can be observed. The spatial area is thereby mainly determined by the range within which data can be recorded in the environment as well as the environment in which landmarks can be used for the localization of the mobile unit.

A "description of the traffic environment" may comprise in particular information on landmarks in the traffic environment. This may thereby comprise positions and characteristic properties of the landmarks.

The recording of the data sets in the first step of the method takes place in a generally known manner by a laser scanner. A recorded data set comprises in particular a single scan of the laser scanner, wherein parameters such as distances and reflection properties at points in the traffic environment can be recorded by pivoting a beam of light and detecting the reflected light within a certain recording area. The data points thereby correspond with individual measurements, in particular at different angles relative to the laser scanner.

In one embodiment, the recording of the data sets is performed periodically by the laser scanner. Furthermore, the method is periodically executed. Current data can thereby be provided continuously in order to be able to record as accurately as possible the landmarks in the traffic environment at any given point in time. When further processing the recorded landmarks, a continuous specification and tracking of a landmark-based localization can take place based on the current data.

In other embodiments, the recording can also take place in another manner, for example asynchronously.

Furthermore, it can be provided that data is recorded by other sensors. In particular, data relating to a movement of the mobile unit, in particular a vehicle, can be recorded. For example, a speed and an acceleration of a vehicle can be recorded as well as a movement direction and a steering angle.

Moreover, it may be provided that data from other apparatuses is recorded, wherein in particular a data-link connection can be used. For example, a data-link connection of the mobile unit to further units can exist and data recorded by them can be used. The data-link connection can be established in different, generally known manners and data can be transmitted in a manner that is also known, wherein for instance a method for accessing certain data from a remote unit can be used. For example, data recorded by other vehicles can be transmitted to a vehicle or other apparatuses can be used in an analogous manner.

In a further embodiment, the data points of the recorded data sets are filtered, wherein only data points that are assigned positions on a road surface are taken into consideration. A classification of the data points recorded by the laser scanner is thereby used, which is automatically generated in the case of available laser scanners.

In particular, the recorded raw data can be filtered in a useful manner. For example, the recorded landmarks can be restricted to characteristics of the road, for instance road markings that represent particularly important landmarks for the localization of vehicles in particular.

In a second step, the recorded data is combined into output data for further processing. In particular, a single data set is used in a special case. Furthermore, an accumulation can be performed. The suitability of a certain number of data points and/or data sets for further processing as well as the need for an accumulation thereby also results from the properties of the recorded data sets, for instance the number of data points of a single data set. The output data may thereby be saved in a ring buffer in a generally known manner, wherein the respective last recorded data is saved while the oldest existing data is deleted. In this manner, the data from a certain time period in the recent past can be saved together.

In a further step, a segmentation takes place based on the output data. Data points potentially belonging to a landmark are thereby combined into "segments." A subset of the output data is thus defined for the associated data points for each potential landmark.

In a further embodiment, the segmentation is performed by means of a Euclidean Cluster Extraction Algorithm, wherein data points for which the separation distance is less than a predetermined threshold value are each assigned to a segment. This allows a simple and fast determination of the segments.

In alternative or additional embodiments, other algorithms can be used, for instance a Random Sample Consensus algorithm (RANSAC), wherein different segmentation methods can be implemented.

The analysis of the segments subsequently may take place by means of a principle component analysis (PCA). Parameters are thereby determined for each segment and saved as "landmark parameters." The landmark parameters are particularly suitable for defining the segment in a particularly comprehensive manner. For example, a geometric shape can be determined which describes the distribution of the data points of a segment.

In a further embodiment, the principle component analysis for determining the landmark parameters for each segment comprises a determination of an approximation ellipse for the segment. The geometric shape of the approximation ellipse thereby allows the approximation of a plurality of other geometric shapes easily and with a high accuracy.

The parameters of the approximation ellipse thereby allow conclusions about the actual dimensions and parameters of the geometric shape. In particular, points and lines can be particularly well approximated by the approximation ellipse. Furthermore, the PCA allows a particularly fast and robust analysis of the segments. In particular, the relevant parameters of the approximation ellipse are determined together in one step so that the number of calculation steps and the computing effort for recording the landmarks are considerably lower than other known methods. In particular, two- or multi-dimensional data can be easily processed and suitable parameterization can be determined. For example, it can thus be determined particularly quickly and easily which length and width an elongated object, for instance a line, has.

In one embodiment, the landmark parameters comprise at least one relative position relative to the laser scanner. A position determination for the detected object relative to a detection coordinate system is thereby performed, in particular relative to a vehicle coordinate system.

In particular, this position can be determined together with the other landmark parameters within the framework of the principle component analysis. For instance, Cartesian coordinates can thereby be used or a position can be determined by means of distance and angle. The origin of the coordinate system can be assumed in particular at the mobile unit so that a position determination first takes place relative to it. In a further step, a transformation into another coordinate system, in particular a global coordinate system, can then take place.

In a further step, object classes are determined based on the landmark parameters. A classification according to basic geometric shapes, which allow a basic assignment of the segments to different landmarks, thereby takes place.

In a further embodiment, the segments are classified based on the object classes assigned to them as point-based, line-based or polyline-based objects. Different landmarks, in particular road markings and/or different traffic signs such as poles, can thereby be well detected and parameterized.

Point-, line- or polyline-based landmarks thereby allow a particularly useful classification of landmarks, in particular road markings. The classification thereby takes place depending on the landmark parameters necessary for complete characterization of a landmark, in particular the number of positions to be determined in order to record the progression of a road marking.

As already described above, different parameters can be determined and saved depending on the object class. A particularly efficient data management is thus enabled.

According to one embodiment, the determined landmark parameters for segments of the line-based or polyline-based object class comprise a length parameter and a width parameter as well as at least one start position and one end position. The most relevant parameters for describing these classes of objects as well their variances are thereby provided for further analysis.

In a further embodiment, a filtering is performed based on the landmark parameters of the segments. The segments considered real landmarks are thereby selected and the further calculations can be limited to them.

For the filtering, threshold values for instance can be used to check the plausibility that identified objects correspond with actual landmarks and to avoid artifacts of the detection. An upper and/or lower limit for the recorded radius can thereby be checked for point-based landmarks. Furthermore, in the case of line-based or polyline-based landmarks, upper and/or lower threshold values can be used for the recorded length and/or width.

Furthermore, legal requirements can be used, which provide certain dimensions for certain landmarks of the traffic infrastructure, in particular road markings. For example, a minimum and/or maximum width and/or length of lines can be specified which are accepted as potential road markings. Furthermore, certain shapes can be detected and their plausibility for the detection as landmarks can be assessed.

Optionally, a simplification of polyline-based objects by means of the Ramer-Douglas-Peucker algorithm or a similar suitable method can also be performed.

The information recorded and determined based on a data set via individual landmarks is combined into respectively one "landmark observation." The data can be structured in this manner. A landmark observation thereby comprises according to the present aspect all information on a specific viewing of a specific landmark within a set of output data. In the event of repeated use of the method, a series of landmark observations can thus be determined for the same real landmark if the landmark is viewed multiple times, in particular also by several sensors and recording units. In particular, an assignment of the landmark observation to the corresponding landmark may take place, for instance by means of an identification number, for example in order to be able to compare several landmark observations of the same landmark with each other.

In a further embodiment, the landmark observations are assigned to elements of a street infrastructure. The data can thereby be processed so that an assignment of the landmark observations to specific landmarks can be performed.

For example, a correspondence with landmarks which were recorded by means of further data sets can also be determined in this manner, and further processing is enabled. In particular, a position determination can then be performed, wherein different methods can be used for the landmark-based localization.

The method according to the explanation finally provides an output of the landmark observations. The data may be transmitted for example to a unit for the landmark-based localization; thus, there does not have to be an output observable for a user, such as in the form of a display.

The further processing of the data for a landmark-based localization can take place in any manner.

In one embodiment of the method, environment model data is determined based on the specific landmark observations, wherein the environment model data comprises a description of the traffic environment of the mobile unit. Data that is particularly relevant for a landmark-based localization of the mobile unit can thus be provided by means of the environment model data.

The specific environment model data comprises in particular data about landmarks and positions assigned to the landmarks. The environment model data can thereby be determined such that they represent a comprehensive description of the landmarks in the traffic environment of the mobile unit and enable a landmark-based localization based on it.

In particular, the environment model data comprises information about the landmarks in the traffic environment of the mobile unit. Object classes assigned for instance to the landmarks can thereby be determined and saved and the landmark parameters with data on the positions of the landmarks can be comprised. The requirement that the generated environment model should be consistent thereby concerns above all those landmarks for which there are several landmark observations from several sightings: These are fused and followed over a certain time period, wherein so-called "tracks" are generated. The tracks thereby represent pertinent observations for a landmark and their tracking based on the positions which were determined for the observations. The tracks of the environment model data serve to manage the data recorded for a landmark in the traffic environment such that the landmarks are finally represented as precisely as possible by the environment data.

Furthermore, when determining the environment model data, distance calculations for landmark observations can be performed based on their object class and their landmark parameters, wherein the landmark observations are assigned to specific landmarks based on the distance values. Corresponding landmark observations can thereby be ascertained very simply and quickly.

The positions of landmarks, which are represented by the tracks of the environment model data, are compared based on the landmark parameters of different landmark observations and it is determined based on distance calculations which recorded landmarks belong together. In particular, the distance calculations may be performed based on the object classes assigned to the landmarks and landmark observations. It is thereby taken into consideration in particular that different forms of landmarks require different methods for the distance calculation. For example, a single position can be assigned to point-based landmarks, wherein the geometric distance of such landmarks with respect to each other can be clearly determined based on the respective positions. The calculation is complicated for line- and polyline-based landmarks in that a single, unique position value that could be compared with another position value cannot be assigned to them. Instead, several positions are characteristic for such landmarks, for instance start and end positions as well as mid-points.

Different distance metrics may thus be provided for different object classes. In particular, a calculation is thereby performed for point-based landmarks based on the Mahalanobis distance. This equation is modified for line-based landmarks, each of which has a start and an end position, such that the four combination options for the distance measurement are taken into consideration together (start position 1-start position 2; end position 1-start position 2; start position 1-end position 2; end position 1-end position 2). As a measure for the distance between polyline-based landmarks (line segments), a surface area enclosed by them is used. Alternatively or additionally, other suitable methods can be used, through which distance metrics can be determined.

In particular, the data for landmark observations is evaluated for each real landmark, which means that for each landmark detected in the traffic environment, the data from the associated landmark observations is saved and the data from different landmark observations can be processed together.

For further determination whether a landmark observation corresponds with a real landmark, probabilities can be assigned to the registered landmarks of the environment model, which specify with which certainty a real landmark was hereby recorded. By comparing the data from different landmark observations which are assigned to the same landmark, the value of the probability can be changed.

In a further embodiment, the environment model data comprises data about landmarks. Probabilities are thereby assigned to the landmarks of the environment model based on the landmark observations and the probabilities are changed based on the landmark observations by means of a Sequential Probability Ratio Test. The probabilities assigned to the landmarks of the environment model, i.e. the tracks, are thus calculated by means of a Sequential Probability Ratio Test. A statistical test can thus be applied, which permits a particularly reliable determination of the probabilities for a variable data base.

For example, a probability of a landmark can be increased if it is confirmed by another landmark observation; otherwise the probability of the landmark is decreased.

A landmark can then be accepted or rejected based on a comparison of its assigned probability with a threshold value. It can thereby be tested in an iterative method whether a decision for or against the acceptance of a recorded landmark can be accepted as actually present. This allows a particularly easy and reliable identification and deletion of misidentifications.

The data from the confirmed landmarks of the tracks is used further in the environment model data in order to represent a description of the traffic environment. The environment model data can thereby correspond for instance with a map of the traffic environment of the mobile unit. In particular, a consistent environment model is generated; that is, the environment model data is generated based on the data recorded by several data sets such that the recorded data sets are consistent with each other.

In one embodiment, an estimated position of the mobile unit is also recorded and reference map data is fetched based on the recorded estimated position, wherein the reference map data comprises reference positions of landmarks. The position of the mobile unit is determined based on the environment model data and the reference map data by means of a particle-filter-based method. A localization can thus take place based on reference map data.

The reference map data is thereby fetched depending on an estimated position of the mobile unit. The estimated position is recorded using generally known methods, for instance by means of a satellite positioning system such as the Global Positioning System (GPS). The fetching itself also takes place in a generally known manner, in particular either by a memory apparatus of the mobile unit or by means of a data-link connection to an external unit.

The recording of the estimated position and the fetching of the reference map data can take place periodically. It can thereby be ensured that suitable reference map data is always available and can be used for the localization. For example, the fetching can take place every 10 seconds or at another set time interval. Furthermore, in a similar manner, the fetching can take place regularly based on other criteria, for example based on a distance from the position of the last fetch so that the reference map data is then always fetched when the position of the mobile unit has changed by a certain amount.

In the case of the particle-filter-based method, a plurality of statically distributed hypotheses about the actual position of the mobile unit is generated and these hypotheses can be represented as individual particles. Probabilities are assigned to the particles so that they correspond with the true position of the mobile unit and, based on the probabilities, the hypothesis which can be assumed with the best probability as the true position of the mobile unit is determined. This position can be subsequently output, for example by transmission to another unit such as a driver assistance system or a navigation system.

Furthermore, the positioning can take place alternatively or additionally based on other methods, for instance by means of a Kalman filter.

The system according to a further aspect for recording landmarks in a traffic environment of a mobile unit comprises a recording unit, through which data sets can be recorded by means of a laser scanner, wherein the data sets comprise data points, and an accumulation unit, through which data points of a certain number of data sets can be saved as output data. Furthermore, it comprises a segmentation unit, through which segments can be determined based on the output data by means of a segmentation, wherein data points are assigned to each of the segments. Moreover, it comprises a processing unit, through which landmark parameters of the respective segment can be determined for each of the determined segments by means of a principle component analysis, and an object class can be assigned to the segments based on the landmark parameters respectively determined for them. Landmark observations can thereby be determined by the processing unit, wherein landmark parameters and an object class are assigned to each landmark observation. Furthermore, the system comprises an output unit, through which the landmark observations can be output.

The system according to the present aspect is designed in particular to implement the method according to the preceding aspect described above. The system thus has the same advantages as the method according to the preceding aspect.

The recording unit may further comprise at least one further sensor type. Data is thereby recorded in manners that complement each other, and redundancy that makes the method more robust is generated by multi-detection. Different sensor types thereby use different detection principles in particular. For example, a camera, a laser scanner, a RADAR detector and/or another sensor can be provided.

In a further embodiment of the system, the landmark observations can be transmitted to a positioning unit. The recorded and determined data can thereby be used for localization. In particular, a landmark-based localization can be executed for the mobile unit, for instance a vehicle.

Alternatively or additionally and in some embodiments, the landmark observations can be transmitted further to other apparatuses, for instance a driver assistance system, which can, by means of the recorded landmarks, support functions for controlling the vehicle or can execute them automatically, or remote apparatuses, for instance other vehicles or vehicle-external apparatuses.

Figure 1B:
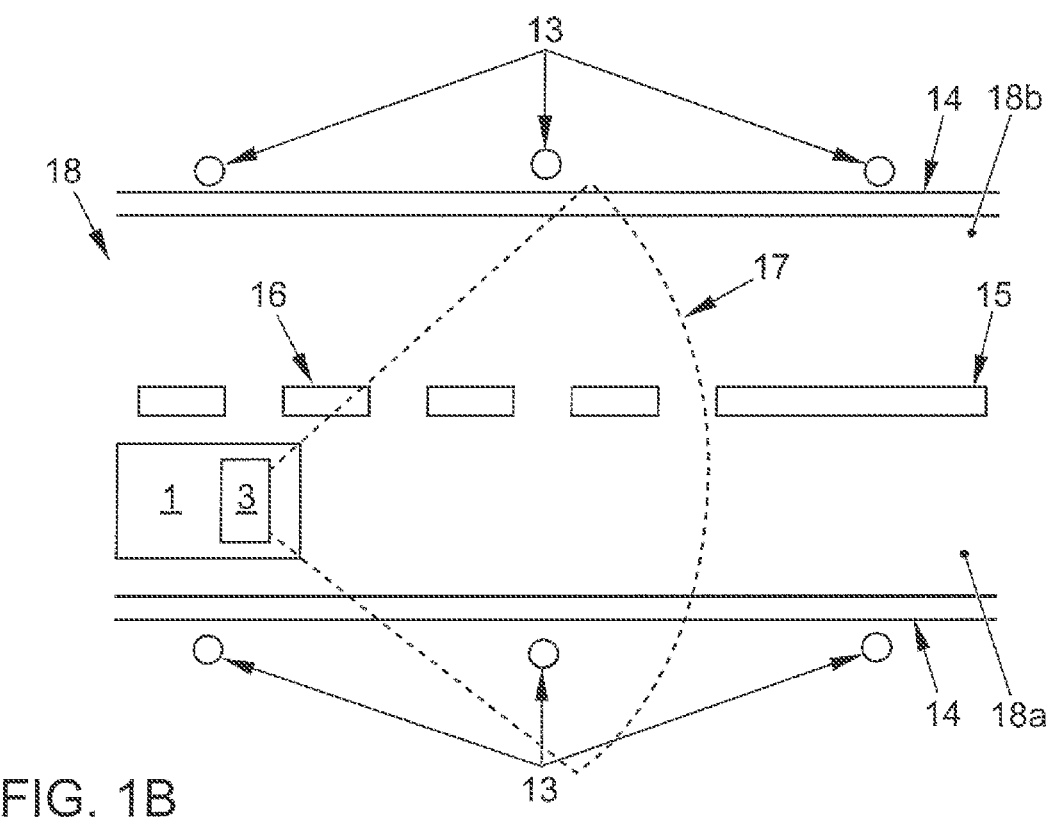

With reference to the FIGS. 1A and 1B, an exemplary embodiment of the system of one aspect is described.

In the exemplary embodiment, a vehicle 1 is provided as mobile unit 1.

The vehicle 1 comprises a recording unit 3, which in turn comprises a laser scanner 3a, a camera 3b and a GPS sensor 3c. The recording unit 3 is coupled with a control unit 4. The following are further connected with the control unit 4: a processing unit 6, a driver assistance system 12 and an interface 5. The processing unit 6 comprises an accumulation unit 7, a segmentation unit 8, a landmark detection unit 9 and a tracking unit 10. The control unit further comprises an output unit 11.

In the exemplary embodiment, the interface 5 is connected to an external server 2 via a data link. The data-link connection is established by the interface 5 in a generally known manner and takes place wirelessly via the Internet in the exemplary embodiment. The connection is thereby established via a telephone network. In further exemplary embodiments, the connection is established in a different manner, for instance indirectly via a mobile telephone connected to the Internet, which can itself establish a connection to the external server 2.

In further exemplary embodiments, the recording unit 3 can alternatively or additionally also comprise further sensors, which use other detection principles in particular. For example, Lidar, radar or ultrasound sensors, cameras in the range of visible light or infrared cameras as well as Time-of-Flight or stereo cameras can be provided.

The GPS sensor 3c provided in the exemplary embodiment is formed in a generally known manner and enables the recording of a position by means of a navigation satellite system such as the Global Positioning System (GPS). Alternatively or additionally, other positioning systems can be used to perform a positioning of the vehicle 1.

Furthermore, it is provided in the exemplary embodiment that data is recorded by other sensors of the vehicle 1. Data that relates to the movement and driving of the vehicle 1 is thereby recorded. The speed and acceleration in particular are recorded as well as the movement direction and the steering angle.

The driver assistance system 12 is an apparatus of the vehicle 1 which supports the driver while driving the vehicle 1. The driver assistance system 12 in the exemplary embodiment can act as a pure information system, which helps the driver; however, it can also fully or semi-automatically influence the locomotion of the vehicle 1, wherein control functions are intervened with.

Without the driver assistance system 12, the driver directly influences the movement of the vehicle 1. If need be, signals or movements of control elements actuated by the driver, such as pedals, the gearshift lever or the steering wheel, are transmitted to corresponding apparatuses of the vehicle 1, which influence the locomotion of the vehicle 1.

Such locomotion of the vehicle 1 is the lowest degree of automation. In the case of a higher degree of automation, apparatuses are intervened with partly automatically, which aid the locomotion of the vehicle 1. For example, the steering of the vehicle 1 or the acceleration in the positive or negative direction is intervened with. In the case of an even higher degree of automation, apparatuses of the vehicle 1 are intervened with such that certain locomotion types of the vehicle 1, for example straight-ahead driving, can be executed automatically. In the case of the highest degree of automation, a specified route can mainly be driven automatically.

The most accurate possible knowledge about the position of the vehicle 1 is thereby required for operating the drive assistance system 12 provided in the exemplary embodiment. In particular, the knowledge about an exact position on the road is needed in order to allow for example a driving of the vehicle 1 in the transverse and/or longitudinal direction and for instance in order to be able to drive a certain lane or trajectory.

FIG. 1B shows a few elements of a typical traffic environment of the vehicle 1. The drawings should be understood as basic sketches in which the used scales and size ratios have no significant meaning.

The spatial environment of the position of the vehicle 1 is thereby understood as the traffic environment, above all the properties relevant for the traffic in this environment. The traffic environment can thus comprise for example other traffic participants in the vicinity of the vehicle 1 (these were not shown in FIG. 1B for purposes of simplification); furthermore, road markings and traffic signs, infrastructure apparatuses and other characteristics can be comprised, for example structures, vegetation or topographical uniquenesses in the environment. The spatial area is thereby mainly determined by the range within which data can be recorded in the environment as well as the environment in which landmarks can be used for the localization.

The vehicle 1 is located in a traffic lane 18*a* of a road 18, which further comprises a further traffic lane 18*b*. A guide line 16, which comprises several partial lines and to which a lane delimiter 15 connects in the form of a solid line, runs between the traffic lanes 18*a*, 18*b*.

The road 18 is further restricted on the outer edges by road delimiters 14. Furthermore, guide posts 13 are arranged on the edge of the road 18.

Furthermore, a recording area 17 of the recording unit 3 of the vehicle 1 is indicated. In the exemplary embodiment, in particular the laser scanner 3*a* and the camera 3*b* of the recording unit 3 of the vehicle 1 are set up so that they record in the recording area 17 data about the traffic environment of the vehicle 1. Different sensors of the recording unit 3 can thereby have different recording areas.

Figure 2:
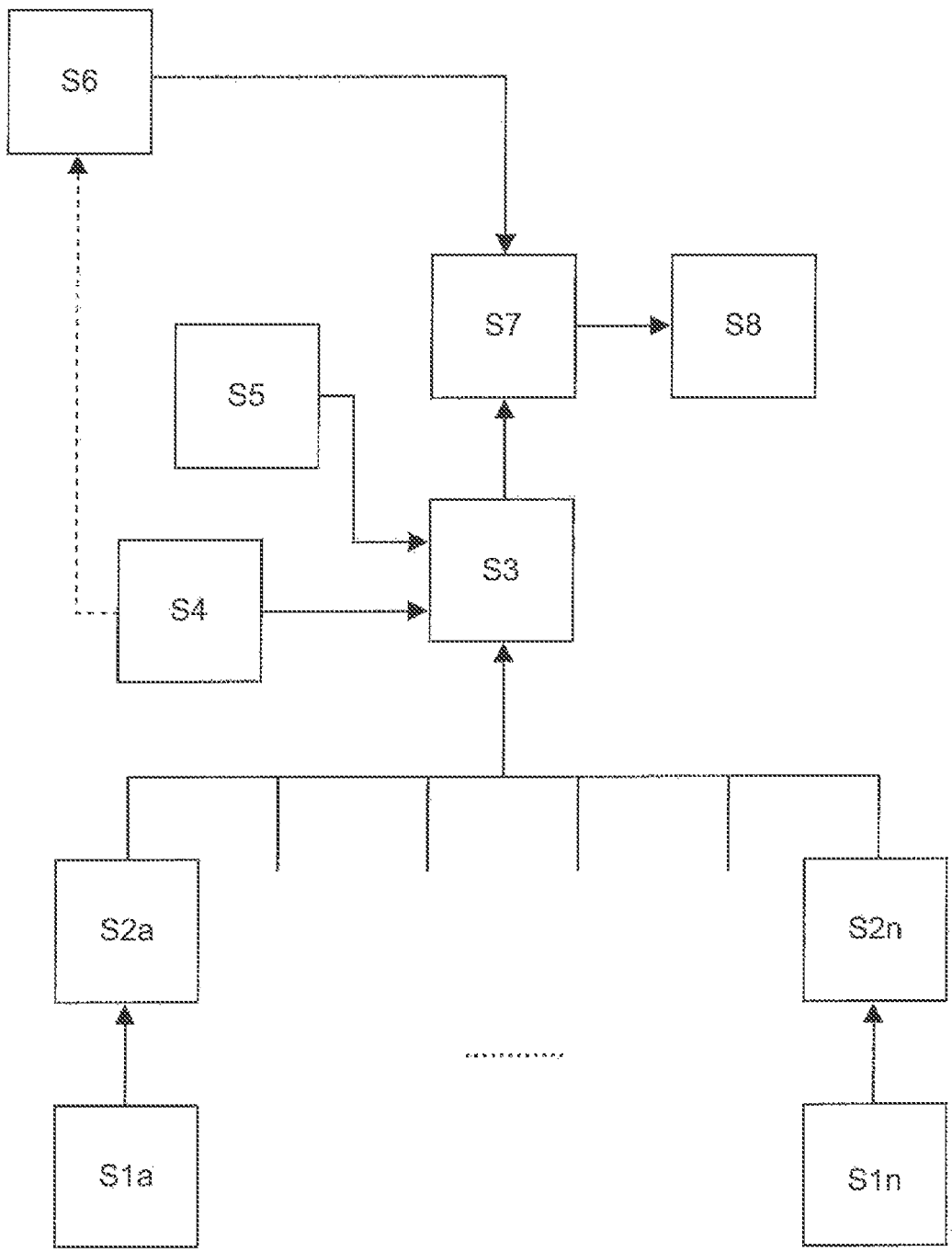
FIG. 2 shows an exemplary embodiment of a landmark-based localization.

With reference to FIG. 2, an exemplary embodiment of a landmark-based localization is explained as a method for determining a position of a vehicle 1. The system explained with reference to FIGS. 1A and 1B is thereby assumed.

In a first step S1*a* to S1*n*, data sets are recorded by a number of n sensors of the recording unit 3 of the vehicle 1, thus for instance by the laser scanner 3*a* and the camera 3*b*. A separate step S1*a* to S1*n* is thereby provided respectively for a number of n sensors.

In further exemplary embodiments, data sets can be recorded alternatively or additionally by sensors of other vehicles and/or apparatuses. Data can then be transmitted to the vehicle 1 by means of a data-link connection, in particular directly from the vehicles and/or apparatuses which recorded the data or indirectly via the server 2. In this case, the processing can take place both outside of the vehicle 1, for instance by the server 2 or the other vehicles and/or apparatuses, or the data sets can be transmitted to the vehicle 1 and further processed there.

The recorded data is evaluated in a further step S2*a* to S2*n*, wherein landmarks are detected and landmark observations are generated. A separate step S2*a* to S2*n* is also provided for this in FIG. 2 for all n sensors.

The "landmark observations" comprise all information about a certain viewing of a certain landmark within the data recorded in the step S1*a* to S1*n*. Points in time are assigned to each of the landmark observations; this is in particular the point in time of the recording of the corresponding data sets. Furthermore, the landmark observations comprise relative positions relative to vehicle 1 as well as parameters which characterize the state of the landmark detected during a viewing, for instance the expanse of the detected landmark.

Figure 3:
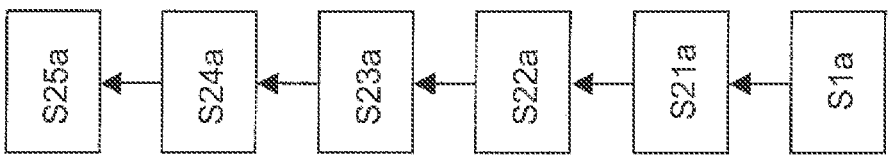
FIG. 3 shows an exemplary embodiment of a recording of landmarks.

The part of the method executed in the steps S1*a* to S1*n* and S2*a* to S2*n* is explained in greater detail below with reference to FIG. 3.

A tracking and a fusion of the previously recorded data is performed in a further step S3. Data from a consistent environment model is thereby generated; this means that the information about the traffic environment of the vehicle 1 is consolidated so that the data relevant for a landmark-based localization is available. In particular, the environment model comprises data from the landmark observations, for instance data on landmarks in the traffic environment as well as the positions of the landmarks.

The generation of a consistent environment model executed in step 3 is explained in greater detail below with reference to FIG. 4.

An estimated position of the vehicle 1 is recorded in a step S4. This is executed in the exemplary embodiment by means of the GPS sensor 3*c* of the recording unit 3, wherein in further exemplary embodiments other methods can be used alternatively or additionally for determining the estimated position. It is thereby assumed that the accuracy with which the estimated position of the vehicle 1 can be determined is insufficient for the operation of the driver assistance system 12. For example, the estimated position can be determined exactly down to 1 m, whereas a driving of the vehicle 1 along a trajectory requires a considerably higher accuracy.

The estimated position is transmitted in the exemplary embodiment in a step S6 by means of the interface 5 to the external server 2 and the server provides reference map data in terms of an "electronic horizon" and transmits it to the vehicle 1. The step S6 takes place in particular within the framework of a fetching of the reference map data from the external server 2. The reference map data comprises data on landmarks in the traffic environment of the vehicle 1. It can be determined with the help of the estimated position which data relevant for the traffic environment of the vehicle 1 should comprise the reference map data.

In particular, the reference map data and the data of the environment model are structured so that they can be compared with each other, for instance in that positions of landmarks in the respective data can be compared with each other.

In further exemplary embodiments, it is provided that the reference map data is fetched alternatively or additionally from a memory unit of the vehicle 1. In this case, a data-link connection to the external server 2 is not required and the method can be operated for example under the conditions of an intermittent network connection.

A proper motion estimation is performed in a further step S5. In particular, data from vehicle sensors is thereby used, for instance for the speed, acceleration, tilt, direction, steering angle and further data relevant for the movement of the vehicle 1. It can be determined based on this data how the vehicle 1 moves, wherein in particular it is determined with high accuracy at which position the vehicle 1 is located at the point in time when a data set is recorded by means of the recording unit 3. In particular, the change in the position of the vehicle 1 can thus be determined since the last recording of an estimated position.

The estimated position and proper motion estimation determined in the steps S4 and S5 are taken into consideration in addition to the data from the landmark observations for the creation of the consistent picture of the environment through tracking and fusion in step S3.

Based on the picture of the environment and the reference map data, a particle-filter-based localization is performed in a step S7. Hypotheses for the position are thereby determined statistically based on the data from the environment model and the reference map data, wherein the hypotheses are represented as "particles." Probabilities of the hypotheses are determined by means of a weighting method based on the reference map data and the most probable position is determined. This is the position of the vehicle 1 determined by the method.

Further details about the method used in step S7 are explained in greater detail below with reference to FIG. 5.

An output of the position takes place in a further step S8, wherein in the exemplary embodiment the determined position is transmitted to the driver assistance system 12 by means of the output unit 11. Alternatively or additionally, the position can be transmitted in this step to different units of the vehicle or vehicle-external units.

An exemplary embodiment of a recording of landmarks is explained with reference to FIG. 3. The system explained with reference to FIGS. 1A and 1B is thereby assumed. In particular, the steps described below can be understood as part of the landmark-based localization explained above with respect to FIG. 2. The method explained here for a sensor can be applied respectively in particular to the data recorded by the sensors of the system.

In a first step S1a, data sets are recorded by one of the sensors of the recording unit 3 of the vehicle 1. In particular, the special case of data being recorded by the laser scanner 3a is considered here; however, the method can be transferred to other sensors with corresponding modifications.

The recorded data sets comprise data points, wherein the individual data sets each comprise the data points which are recorded during a period of the pivoting of the laser beam of the laser scanner 3a. In particular, a distance value is recorded for each data point as well as data on the reflection of the surface from which the laser beam is reflected. The recording of the data thereby takes place periodically through regular pivoting of the laser beam over a certain angle range.

Optionally, a filtering can be performed in this first step S1a. In particular, a suitable laser scanner 3a can already provide an integrated classification of the data points, which comprises for instance information about whether a surface point was detected on the road 18 for a data point. For example, all other data points except for those on the road can be ignored if road markings should be recorded as landmarks.

An accumulation is performed in a further step S21a. In a special case, the data points of a single data set, here thus a scan of the laser scanner 3a, can thereby already form a sufficient data base so that an accumulation of the data points of a data set is performed.

In other cases, the data points of several recorded data sets can be accumulated. The accumulated data forms the output data, based on which the further processing is subsequently performed.

The data points can thereby be saved in particular in a ring buffer, in which the newly recorded data points are continuously saved, while the older data points are simultaneously deleted. This means that the most current data from a certain time period or a certain data volume is continuously provided.

A segmentation based on the output data is performed in a further step S22a. Such data points which appear to be associated are thereby each assigned to a segment. In particular, a Euclidean Cluster Extraction Algorithm can be used for this, in which such points which have less than one specific maximum distance from each other are assigned to a common segment. Alternatively or additionally, other methods for the segmentation can be used.

In a subsequent step S23a, the segments are analyzed by means of a Principal Component Analysis (PCA) and an approximation ellipse is determined for each of the segments. Landmark parameters are thereby determined for each of the segments, which clearly define in particular the determined approximation ellipse. In particular, the landmark parameters comprise a direction parameter, a length parameter, a width parameter as well as a start and an end position. Furthermore, the variances for the respective values can be determined. The landmark parameters can thereby be determined based on the PCA in one step in particular.

A classification of the segments based on the determined landmark parameters is performed in a step S24a. In particular, three classes are thereby provided, namely point-based, line-based and polyline-based landmarks. Point-based landmarks are characterized by a certain expanse and a position. Line-based landmarks have a start and an end position, while polyline-based landmarks have additional intermediate positions.

For example, solid lines can be detected as polyline-based landmarks, since neither a clear start nor a clear end point is detected for them. In particular, such lines can be characterized as solid lines, which extend beyond the recording area 17 of the recording unit 2 and are not completely recorded by the data points.

Positions are defined in particular for the landmark parameters. This means that at least one position, which is initially specified relative to the recording unit 3 or respectively to the vehicle 1, is determined for an approximation ellipse determined by means of PCA.

A filtering, which comprises in particular a plausibility test, can be performed based on the determined landmark parameters. It is thereby checked for instance whether the length and width of detected line-based landmarks are compliant with legal requirements for the dimensions of thusly formed road markings. In particular, elements of a street infrastructure are assigned respectively to the landmark observations, i.e. for instance parts or entire elements of the guide line 16, the road delimiter 14, the lane delimiter or the guide post 13 shown in FIG. 1B.

Furthermore, it can be determined whether a landmark, for instance a road marking, was detected with sufficient certainty based on certain variances. Further filter steps can be applied in order to exclude poorly or incorrectly identified landmarks.

In a step S25a, landmark observations are finally generated; this means that the information determined for the recorded data points is combined so that it comprises all data relevant for further processing for a landmark-based localization. The individual landmark observations are thereby each assigned to a landmark; this means that a landmark observation comprises data which was determined during a viewing of the landmark and which can thus be assigned to the detected state of a landmark at the time of the recording.

The generated landmark observations specify in particular a state vector of a landmark, wherein the data for this differs depending on the type of landmark: the state vector $s^{PO}$ of a point-based landmark observation is specified as $$s^{PO} = \begin{pmatrix} p^{vrf} \\ \Sigma_p \\ p^{wgs} \\ \text{Diameter} \\ \text{Height} \\ \text{Time stamp} \\ \text{Sensor}^{ID} \\ \text{Belief} \\ ID \end{pmatrix},$$

the state vector $s^{DL}$ of a line-based landmark observation as $$s^{DL} = \begin{pmatrix} (p_1^{vrf}, p_2^{vrf}) \\ (\Sigma_{p_1}, \Sigma_{p_2}) \\ (p_1^{wgs}, p_2^{wgs}) \\ \text{Length} \\ \text{Width} \\ \text{Time stamp} \\ \text{Sensor}^{ID} \\ \text{Belief} \\ ID \end{pmatrix}$$

and
the state vector $s^{PL}$ of a polyline-based landmark observation as $$s^{PL} = \begin{pmatrix} (p_1^{vrf}, \ldots, p_n^{vrf}) \\ (\Sigma_{p_1}, \ldots, \Sigma_{p_n}) \\ (p_1^{wgs}, \ldots, p_n^{wgs}) \\ \text{Length} \\ \text{Width} \\ \text{Time stamp} \\ \text{Sensor}^{ID} \\ \text{Belief} \\ ID \end{pmatrix}$$

$p_n^{vrf}$ thereby describe coordinates in the vehicle coordinate system and $p_n^{wgs}$ coordinates in the global coordinate system, wherein each point is specified as a triple $p=(x,y,z)$. Furthermore, uncertainties $\Sigma_{p_n}$ are specified. The point in time of the detection is specified in the field "Time stamp," also the identification of the sensor as "Sensor$^{ID}$" and the identification of the landmark observation as "ID." The field "Belief" is required for the further processing of the landmark observations for statistical entries of a probability. The characterization of the recorded landmarks is specified by the fields "Diameter," "Height," "Length" and "Width."

Alternatively or additionally, the state vectors can comprise other elements, for example a surface area or reflection level.

The landmark observations generated in step S25a can be output and transmitted to a module or a unit for further processing. In particular, the step S3 described with reference to FIG. 2 can thus be performed. Furthermore, landmark observations of the n sensors can thereby be combined, for instance in a certain data structure, wherein in particular the state vectors described above can be used.

Figure 4B:
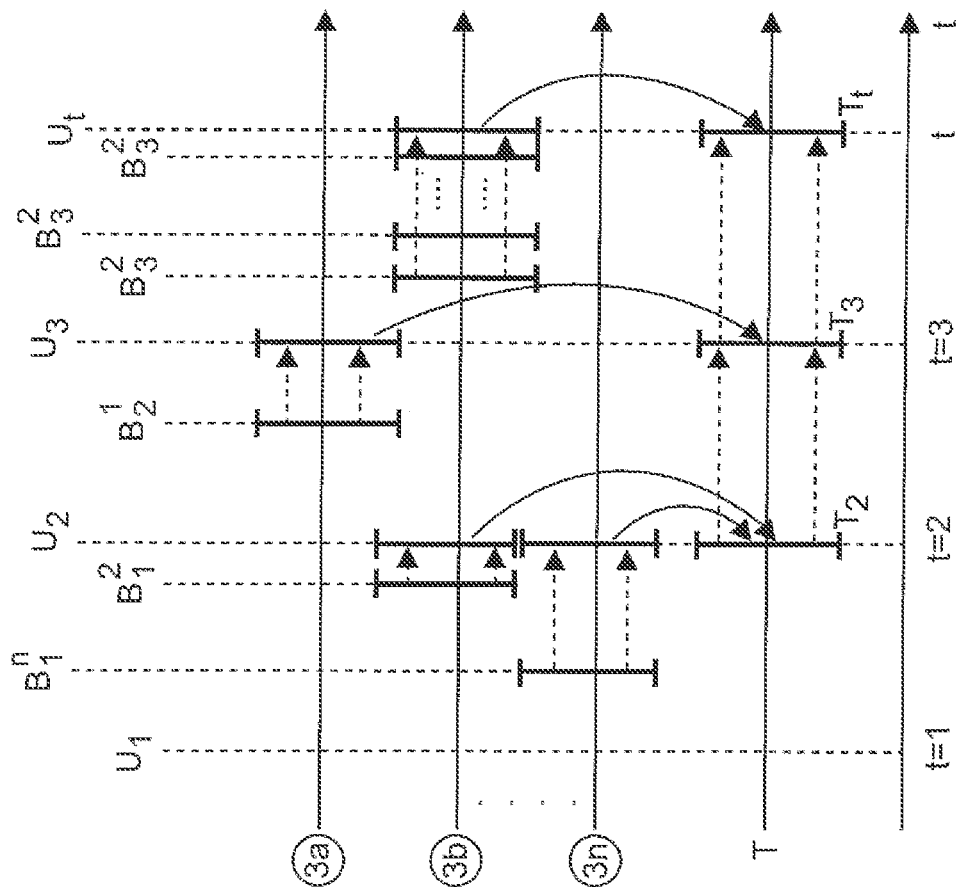
FIGS. 4A and 4B show a generation of a consistent environment model.
Figure 4A:
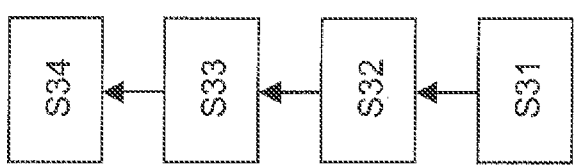

With reference to FIGS. 4A and 4B, a generation of a consistent environment model is explained. The system explained with reference to FIGS. 1A and 1B is thereby assumed. In particular, the steps described below can be understood as part of the landmark-based localization explained above with reference to FIG. 2. In the case of the landmark-based localization, a sensor- and landmark-specific preprocessing of the raw data is performed in particular in a first layer and a consistent environment model is built by means of a tracking and function method in a second layer. In a third layer, a map is finally built based on the environment model.

The described method steps can be combined in particular in a tracking and fusion model, wherein this is executed in particular by the tracking unit 10. The recorded landmark observations are thereby fused and stabilized into a consistent landmark environment model, hereinafter referred to as the "environment model." The problems to be thereby resolved relate in particular to the fact that the data sets are recorded at different points in time and thus also at different positions during a movement of the vehicle 1. Moreover, misidentifications should be identified and removed.

Landmark observations are first received, each of which are assigned to certain points in time and relative positions relative to the vehicle 1. This takes place in particular based on the method described above with reference to FIG. 3. This preparatory step describes a sensor-based layer of the method.

Based on the estimated position (see FIG. 2, step S4) and the proper motion estimation (see FIG. 2, step S5), estimated absolute positions are assigned to the landmark observations. Thus, a coordinate system can be tracked during the continuous movement of the vehicle 1 and the relative coordinate system of the vehicle 1 can be converted to a global coordinate system through transformation.

A temporal synchronization is performed in a first step S31. This is shown in detail in FIG. 4B. Axes for each sensor 3a, 3b, 3n of the recording unit 3 are shown parallel to a time axis (t). Furthermore, an axis (T) for the so-called Tracks is shown, for which the landmark observations are combined at certain points in time. A track thereby represents the data recorded, fused and synchronized for a real landmark.

At certain points in time $u_t$, which are represented as dashed lines, data about the proper motion of the vehicle 1 is received. Quantities of landmark observations $B_t^n$ are thereby respectively provided, which are output in particular as a data object from one of the n sensors. The landmark observations $B_t^n$ are represented here as thick vertical lines. The landmark observations $B_t^n$ are not recorded synchronously with each other and with the data for the proper motion of the vehicle so that the movement must be compensated for during the time difference between two points of time in order to be able to compare the data. This is represented by horizontal dashed arrows. The landmark observations $B_t^n$ are buffered until data is available for a new movement step. The landmark observations $B_t^n$ are then synchronized for each sensor 3a, 3b, 3n for the points in time $u_t$. It is made clear by curved, downward-pointing arrows that this synchronized data is fused into tracks $T_t$. The thusly created tracks are tracked with each movement step. The landmark observations of the $B_{t-1}^n$ and $T_{t-1}$ are thus available in the coordinate system at the point in time t of the movement state $u_t$.

In a further step S32, distance calculations for landmark observations and landmarks of the tracks are performed in order to assign corresponding landmark observations of the $B_t^n$ to the tracks $T_t$. Point-, line- and polyline-based landmarks can thereby first be grouped since only they can correspond amongst each other.

A gating is performed by means of generally known methods, wherein only landmark observations $B_t^n$ in a certain environment of the respective tracks $T_t$ come into question for the association.

It is now determined whether a landmark observation $B_t^n$ is to be assigned to a certain track $T_t$. This is determined based on the spatial proximity between both points. In order to calculate the distances, the following methods are used in the exemplary embodiment:

For point-based landmarks, the state vector $s^{PO}$ of a point-based landmark is observed, in which the position at time t is specified as point p=(x,y,z) in the vehicle coordinate system vrf. A distance function $d^{PO}$ between a point $\vec{p}_h$ of a landmark observation $b_h^{s^{PO}}$ and a point $\vec{p}_r$ of a track $t_r^{s^{PO}}$ should now be calculated. A vector between $\vec{p}_h$ and $\vec{p}_r$ is thereby given as $\vec{z}_{p_r p_h}$. A calculation of the Mahalanobis distance is performed based on the equation $$d^{PO}(b_h^{s^{PO}}, t_r^{s^{PO}}) = \sqrt{(\vec{z}_{p_r p_h})^T \cdot S^{-1} \cdot \vec{z}_{p_r p_h}}$$

wherein $S^{-1}$ is the inverse covariance matrix of the track landmark $t_r^{s^{PO}}$.

In the case of line-based landmarks, the landmark observations comprise start and end points. The determination of a geometric distance is not so clearly possible with typical methods since for example considerably different results are to be expected when switching the start and end positions. For this reason, the distance metric is modified here according to the Mahalanobis equation.

A landmark observation $b_i^{s^{DL}}$ with start point $\vec{s}_i$ and end point $\vec{e}_i$ as well as a landmark of a track $t_o^{s^{DL}}$ with start point $\vec{s}_o$ and end point $\vec{e}_o$ are observed. Distances between start and end points of $b_i^{s^{DL}}$ and $t_o^{s^{DL}}$ can now be calculated, wherein four combination options result (distance measurements start position 1-start position 2; end position 1-start position 2; start position 1-end position 2; end position 1-end position 2):

$$\kappa_{s_o, s_i} = \sqrt{(\vec{s}_o - \vec{s}_i)^T \cdot S^{-1} \cdot (\vec{s}_o - \vec{s}_i)},$$

$$\kappa_{e_o, e_i} = \sqrt{(\vec{e}_o - \vec{e}_i)^T \cdot S^{-1} \cdot (\vec{e}_o - \vec{e}_i)},$$

$$\kappa_{s_o, e_i} = \sqrt{(\vec{s}_o - \vec{e}_i)^T \cdot S^{-1} \cdot (\vec{s}_o - \vec{e}_i)},$$

$$\kappa_{e_o, s_i} = \sqrt{(\vec{e}_o - \vec{s}_i)^T \cdot S^{-1} \cdot (\vec{e}_o - \vec{s}_i)},$$

wherein $S^{-1}$ is again the inverse covariance matrix of the track landmark $t_o^{s^{DL}}$.

Values for a quadratic means (QM) can subsequently be calculated according to the formula:

$$QM_{ss,ee} = \frac{(\kappa_{s_o, s_i})^2 + (\kappa_{e_o, e_i})^2}{2}$$

$$QM_{se,es} = \frac{(\kappa_{s_o, e_i})^2 + (\kappa_{e_o, s_i})^2}{2}$$

In conclusion, the distance function $d^{DL}$ can be calculated according to:

$$d^{DL}(b_i^{s^{DL}}, t_o^{s^{DL}}) = \min(\sqrt{DQVS_{ss,ee}}, \sqrt{DQVS_{se,es}})$$

Further methods for determining the distance metric can be used alternatively or additionally.

A further distance metric is defined for polyline-based landmarks, i.e. line segments. In addition to the start and end positions, intermediate points are also thereby taken into consideration in order to determine a distance measurement. In particular, a surface area between the line segments is determined.

A landmark observation $b_k^{s^{PL}}$ is observed, the progression of which is modeled as an interrelated bulleted list ($p_1, p_2, \ldots, p_i$), and a landmark observation $t_j^{s^{PL}}$ with the interrelated bulleted list ($p_1, p_2, \ldots, p_q$). In order to determine the surface area located between the polylines, a projection of the line segments onto each other is first performed and the line segments are cut off such that only those sections of the line segments that respectively lie opposite a section of another line segment are further processed.

For this, the points along both line segments can be determined, in the case of which a perpendicular connection to an end point of the respective other line segment can be determined. The cutting off is performed at these spots. It is for example thereby avoided that length differences of the line segments lead to an overestimation or underestimation of the distance measurement.

The surface area located within the line segments is calculated for example by means of the Gaussian trapezoidal formula. For this, the polygon located within the line segments is first divided into subpolygons based on intersections of the line segments, if available. The surface areas of the subpolygons are subsequently added up and normalized based on the length of the sections of the line segments.

The shortest distance is used as the criterion for the assignment of the corresponding landmark observations to the landmarks of the tracks, wherein the greedy-nearest-neighbor method can be applied. Alternatively or additionally, other methods, such as the Hungarian method, can be used for the assignment.

In a further step S33, a Track Management is performed, wherein probabilities are assigned to the landmarks and changed, wherein a Sequential Probability Ratio Test (SPRT) is applied in order to check whether a detected landmark corresponds with an actual landmark in the traffic environment of the vehicle 1.

If for example a landmark is observed at a point in time and is no longer observed at another point in time, it can be checked whether a real landmark was detected or whether there is a misidentification. If on the other hand a landmark is detected in several consecutive landmark observations, then this is assessed as a confirmation and the value of the assigned probability increases.

In the exemplary embodiment, if the same probability is first assigned to the detected landmarks, then the probability is increased if the landmark is confirmed and lowered if the landmark is not confirmed. If the value of the probability exceeds or falls short of a certain threshold value, the hypothesis that it concerns a detection of an actual landmark is accepted or respectively rejected. It is thereby determined by means of the SPRT as a statistical test which landmarks should continue to be taken into consideration.

A null hypothesis $H_0$ ("all observations originate from a false detection") and an alternative hypothesis $H_1$ ("all observations originate from a real detection") are thereby checked. It is thus checked with which certainty a real landmark was detected based on a landmark observation. This check takes place based on the likelihood quotient LR:

$$LR = \frac{p(D|H_1)}{p(D|H_0)} = \frac{p(D|H_1)}{1-p(D|H_1)} = \frac{P_T}{P_F} = \frac{P_T}{1-P_T},$$

wherein $P_T$ and $P_F$ describe probabilities belonging to the hypotheses ($H_0$/$H_1$ or respectively true/false) and D the data.

In order to explain the method, individual landmarks observed at time t are described as $z_t$. Furthermore, it is assumed that, in the case of the method executed up until this point, all landmarks of the measurements $B_t$, for which no corresponding landmark was found in the case of the tracks $T_t$ with the distance function, were already received as potential new tracks in $T_t$. The quantity of the observations at the point in time t is called $Z_t$. The observation of the i-th landmark z at time t is this described as $z_t^i \in Z_t$.

An initialization probability of $L_0$ is assigned to the observations at the time of the receipt of the data. The same value can thereby be selected for all new observed landmarks or a sensor-specific value can be assigned. In order to avoid numeric instabilities, the log likelihood quotient $LLR^i$ can be used for the i-th landmark. The probability that the i-th landmark originates from a real detection (alternative hypothesis $H_1$) is now developed above and beyond the detection times based on observed landmarks that correspond with each other:

$$LLR^i = \ln(L_0) + \ln\left(\sum_{t=1}^{t} \frac{p(z_t^i|H_1)}{1-p(z_t^i|H_1)}\right)$$

It is checked based on this value whether $LLR^i$ exceeds (A) or falls short of (B) a certain threshold value:

$$B - \ln\left(\frac{\beta}{1-\alpha}\right) \le LLR^i \le \ln\left(\frac{1-\beta}{\alpha}\right) = A$$

$LLR^i$ thereby corresponds with a probability for the respective i-th landmark of the environment model, wherein this probability is understood as the confidence value for the track assigned to the respective landmark. In particular, the field "Belief" of the state vector explained above can be used for this. The system design parameters a and R are thereby specified and describe the probability of the confirmation of a false track or respectively the deletion of a real track. Furthermore, the value of the probability of a landmark is then increased or decreased depending on whether or not it is confirmed by other landmark observations. If it is exceeded or fallen short of, the iterative method is interrupted and the landmark is confirmed or respectively rejected:

$$\begin{cases} LLR^i(t) \ge A & \text{Confirm track} \\ B \le LLR^i(t) \le A & \text{Continue test} \\ LLR^i(t) \le B & \text{Delete track} \end{cases}$$

Environment model data is finally generated in a step S34; this takes place in particular in a "track innovation" step. The quantity of the tracked landmarks in the environment model is thereby updated. This comprises data on the landmarks recorded in the traffic environment of the vehicle 1, in particular their positions. In particular, positions, uncertainties and confidence values of the landmark observations are updated based on the data determined in the previous method steps.

The respectively assigned landmarks can be received in a map based on the confirmed tracks. Such a map comprises the determined and optimized positions for the landmarks.

Different generally know methods can be applied in order to update the positions for instance. For example, the last observed position can be taken in the case of several determined positions of a landmark; an exponential smoothing can be performed; a sliding or arithmetic average can be calculated; or a length-based weighting can be used for the position averaging if the landmark has a length.

The environment model data is structured such that it can be compared with the reference map data. In particular, the positions of certain landmarks for example can thereby be compared.

The environment model data is subsequently output, i.e. transmitted to another module or a unit for further processing.

A particle-filter-based localization is explained with reference to FIG. 5. The system explained with reference to FIGS. 1A and 1B is thereby assumed. In particular, the steps described below can be understood as part of the landmark-based localization explained above with respect to FIG. 2.

In the case of the particle-based method, a particle cloud is generated, wherein each particle has a position hypothesis, i.e. stands for a hypothetical position of the vehicle 1. The "particle cloud" thus describes a quantity of particles. Each particle thus represents a particle state, which is understood as the hypothesis for the state of the vehicle 1. It is now statistically checked for which hypothesis, i.e. for which particle, the landmark observations best match the reference map data. An exemplary embodiment of the method is described in detail below.

It is checked in a first step S40 whether an initialization was already performed. If the answer is no, then the initialization is performed in a further step S41. During the initialization, as described above for step S4, the estimated position of the vehicle 1 is recorded for example by means of the GPS sensor 3c at a certain point in time, wherein in particular a larger inaccuracy is assumed. Furthermore, data on the proper motion of the vehicle 1 can be taken into consideration.

Through the use of a movement model in a step S42, a tracking of the position with the proper motion of the vehicle 1 is determined; i.e. the change in the position of the vehicle 1 since the last recording of the estimated position is taken into consideration. A saved estimated position, for instance the last trip of the vehicle 1, or a position entered by the user can thereby also be used for an initialization. A corresponding transformation of the particle cloud is performed in order to compensate for the shift in the position of the vehicle 1 through its proper motion. An inaccuracy of the corresponding sensors and thus also the resulting results should also be assumed here.

In particular, uncertainties for sensors for recording the current position (for instance by means of GPS) or the proper motion (for instance by means of odometry) can thereby be taken into consideration.

A sensor model is applied in a further step S43. A sensor-caused measurement noise is thereby taken into consideration and the probability with which the landmark observations were recorded assuming the respective hypothetical particle state is determined.

A weighting for the individual hypotheses results from this probability, and this weighting is assigned to the hypotheses in a step S44. In particular, a normalization of the probabilities can thereby be performed.

In a further step S45, a smoothing is also performed for the stabilization of the results, wherein great fluctuations in the probabilities for individual particles are smoothed. Such fluctuations can occur in particular when larger differences occur during the recording of a landmark at consecutive points in time, for example due to measurement errors, hidden landmarks or when landmarks disappear from the recording area 17 of the recording unit 3.

For example, the smoothed weighting $\omega_{f,t}$ of the particle f in the time step t can thereby be calculated according to:

$$\omega_{f,t} = \alpha\omega_{f,t} + (1-\alpha)\omega_{f,t-1}$$

An attenuation factor $\alpha$ is thereby selected empirically and the strength of the attenuation can be further determined through suitable selection of the time frame between time steps t and (t−1).

The position corrected according to the preceding steps is output in a step S46. In particular the state of the particle with the maximum assigned probability is thereby taken into consideration. In particular, during the output, the determined position is transmitted to a module or a unit for further processing; the output can take place in particular to the driver assistance system 12.

Furthermore, a resampling can be performed in a further step S47. This can become necessary if the number of particles converges to a single particle through iteration of the method described above. This is brought about in particular because the scattering of the particle cloud increases through accumulated measurement errors in each step, while the proper motion of the vehicle 1 is repeatedly tracked. More and more particles move further and further from the most probable position and a correspondingly low probability is assigned to them. This leads to fewer and fewer particles with a particularly high probability being taken into consideration. After an initial scattering of the particles was generated during the sampling, so-called "recovery particles" are generated during the further iterations of the method by the resampling, through which the particle cloud is enhanced by new hypotheses in order to make the statistical selection of the most probable hypothesis based on a sufficiently large data base.

An exemplary embodiment of an update functionality is explained with reference to FIG. 6. The system explained with reference to FIGS. 1A and 1B and the method explained with reference to FIG. 2 are thereby assumed.

The estimated position of the vehicle 1 is first recorded in a step S50. This is performed for example by the GPS sensor 3c, as described above. The estimated position is transmitted to the external server 2 when the reference map data is fetched.

Reference map data is generated by the external server 2 in a step S51 based on the estimated position and is transmitted to the vehicle 1. The server 2 thereby accesses a reference map database and generates the reference map data so that all information relevant for the landmark-based localization of the vehicle 1 is included, in particular landmarks and their positions in the traffic environment of the vehicle 1.

A landmark-based localization now takes place by the vehicle 1 based on the reference map data. Differences in the landmark observations recorded by the vehicle 1 and the landmark observations to be expected according to the reference map data can thereby be detected. For example, landmarks can disappear or change or new landmarks can be recorded.

A method can be applied in order to ensure that the differences are actual deviations of the real landmarks from the reference map data. In particular, artifacts of the recording of landmarks by the vehicle 1 can thereby be excluded. In particular, generally known methods can be used for this.

In a step S52, update data is generated by the vehicle 1 based on the detected deviations between the reference map data and the actually recorded landmark observations. This comprises information that is appropriate for having the server 2 perform an update of the reference map database in a further step S53. In this case, when the method is repeated, for instance in the case of the repeated fetching of reference map data at a certain estimated position, new reference map data can henceforth be provided which better reflect the actual characteristics of the landmarks.

In this manner, the vehicle 1 can be used for a new measurement of the landmarks in the traffic environment. Furthermore, the server 2 can receive update data from several sources, in particular several vehicles, in the same manner and, for instance by means of statistical methods, decide on an update of the reference map database. Furthermore, it can be determined based on the update data whether a new measurement of the landmarks should be performed in a certain traffic environment, for instance by a special measuring vehicle, which enables a particularly precise recording of the data for the reference map database.

In a further exemplary embodiment, it is provided that the reference map data is provided alternatively or additionally by a different apparatus than the external server 2. For example, this can be an apparatus of the vehicle 1 which allows a fetching of reference map data for the landmark-based localization even without a data-link connection to the server 2. The method can be executed here in an analogous manner, wherein the apparatus of the vehicle 1 also accesses a reference map database and can update it by means of the update data. In a further exemplary embodiment, both the external server 2 as well as the vehicle's own apparatus are provided for fetching reference map data and the updating of the respective reference map database of the apparatus and the server 2 can take place based on a matching between the two.

REFERENCE LIST

1 Mobile unit; vehicle
2 External server
3 Recording unit
3a Laser scanner
3b Camera
3c GPS sensor
3n Further sensor
4 Control unit
5 Interface
6 Processing unit
7 Accumulation unit
8 Segmentation unit
9 Landmark detection unit
10 Tracking unit
11 Output unit
12 Driver assistance system
13 Landmark; guide post
14 Landmark; road delimiter
15 Landmark; lane delimiter
16 Landmark; guide line
17 Recording area
18 Road surface; road
18a, 18b Traffic lane S1a, ..., S1n Recording of data sets
S2a, ..., S2n Landmark detection
S3 Tracking and fusion
S4 Recording the estimated position
S5 Proper motion estimation
S6 Fetching the reference map data
S7 Particle-filter-based localization
S8 Output of the position
S21a Accumulation
S22a Segmentation
S23a Principle component analysis
S24a Classification
S25a Generation of landmark observations
S31 Temporal synchronization
S32 Distance calculations
S33 Assigning and changing of probabilities
S34 Generating environment model data
S40 Checking the initialization
S41 Performing the initialization
S42 Applying the movement model
S43 Applying the sensor model
S44 Assigning the weighting
S45 Smoothing
S46 Output of the corrected pose
S47 Performing of the resampling
S50 Recording the estimated position (vehicle)
S51 Generating the reference map data (server)
S52 Generating the update data (vehicle)
S53 Updating the reference map database (server)

The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method for recording landmarks in a traffic environment of a mobile unit, in which one or more processors are:
   recording data sets by a laser scanner, wherein the data sets comprise data points;
   saving data points of a certain number of data sets as output data;
   determining segments based on the output data by means of a
   segmentation, wherein data points are assigned to each of the segments;
   determining, for each of the determined segments, landmark parameters of the respective segment;
   assigning an object class to the segments based on the landmark parameters determined for each of them;
   determining landmark observations, wherein landmark parameters and an object class are assigned to each landmark observation; and
   outputting the landmark observations; wherein
   the landmark parameters are determined for each of the determined segments by a principal component analysis of the respective segment, which principal component analysis comprises the calculation of an approximation ellipse for the segment; and wherein
   the determined landmark parameters comprise at least one or more of a direction parameter, a length parameter, a width parameter, a start position, and an end position.

2. The method of claim 1, wherein the recording of the data sets is performed periodically by the laser scanner and the method is executed periodically.

3. The method of claim 1, wherein the data points of the recorded data sets are filtered, wherein only data points that are assigned positions on a road surface are taken into consideration.

4. The method of claim 1, wherein the segmentation is performed using a Euclidean Cluster Extraction Algorithm, wherein data points for which the separation distance is less than a predetermined threshold value are each assigned to a segment.

5. The method of claim 1, wherein the landmark parameters comprise at least one relative position relative to the laser scanner.

6. The method of claim 1, wherein a filtering is performed based on the landmark parameters of the segments.

7. The method of claim 1, wherein the landmark observations are assigned to elements of a street infrastructure.

8. The method of claim 1, wherein the segments are classified based on the object classes assigned to them as point-based, line-based or polyline-based objects.

9. The method of claim 8, wherein the determined landmark parameters for segments of the line-based or polyline-based object class comprise a length parameter and a width parameter as well as at least one start position and one end position.

10. The method of claim 1, wherein environment model data is determined based on the determined landmark observations, wherein the environment model data comprises a description of the traffic environment of the mobile unit.

11. The method of claim 10, wherein an estimated position of the mobile unit is further recorded and reference map data is fetched based on the recorded estimated position, wherein the reference map data comprises reference positions of landmarks and
   the position of the mobile unit is determined based on the environment model data and the reference map data by means of a particle-filter-based method.

12. The method of claim 10, wherein the environment model data comprises data about landmarks, wherein probabilities are assigned to the landmarks of the environment model based on the landmark observations and the probabilities are changed based on the landmark observations using a Sequential Probability Ratio Test.

13. The method of claim 12, wherein an estimated position of the mobile unit is further recorded and reference map data is fetched based on the recorded estimated position, wherein the reference map data comprises reference positions of landmarks and
   the position of the mobile unit is determined based on the environment model data and the reference map data by means of a particle-filter-based method.

14. The method of claim 1, wherein the landmark observations specify a state vector of a landmark.

15. The method of claim 14, wherein a data type of the state vector depends on a type of the respective landmark observation.

16. The method of claim 15, wherein the type of the respective landmark observation is one of a point-based landmark observation, a line-based landmark observation, and a polyline-based landmark observation.

17. A system for recording landmarks in a traffic environment of a mobile unit with a recording unit, through which data sets can be recorded using a laser scanner, wherein the data sets comprise data points;

an accumulation unit, through which data points of a certain number of data sets can be saved as output data;

a segmentation unit, through which segments can be determined based on the output data using a segmentation, wherein data points are assigned to each of the segments;

a processing unit, through which landmark parameters of the respective segment can be determined for each of the determined segments, and an object class can be assigned to the segments based on the landmark parameters respectively determined for them, wherein landmark observations can be determined by the processing unit, wherein landmark parameters and an object class are assigned to each landmark observation; and an output unit, through which the landmark observations can be output; wherein the processing unit determines the landmark parameters for each of the determined segments by a principal component analysis of the respective segment, which principal component analysis comprises the calculation of an approximation ellipse for the segment; and wherein the determined landmark parameters comprise at least one or more of a direction parameter, a length parameter, a width parameter, a start position, and an end position.

18. The system according to of claim 17, wherein the landmark observations can be transmitted to a positioning unit.

* * * * *